United States Patent Office 3,624,872
Patented Dec. 7, 1971

3,624,872
SELF-LOCKING CATCH FOR ATTACHING A
SAFETY BELT IN A MOTOR CAR
Arnold Bälder, Hamburg-Garstedt, Germany, assignor to
Klippan G.m.b.H., Hamburg-Garstedt, Germany
Filed Sept. 11, 1969, Ser. No. 856,970
Claims priority, application Germany, Sept. 12, 1968,
P 17 80 408.9
Int. Cl. H44b 13/00
U.S. Cl. 24—241  4 Claims

ABSTRACT OF THE DISCLOSURE

A self-locking catch for attaching a safety belt in a motor vehicle to a shackle comprises a bearing plate located between two side plates forming a casing, a spring-loaded retaining hook pivotably mounted on said bearing plate and a locking lever adapted to lock and release said retaining hook, an extension of said bearing plate having an edge on its underside comprising an arcuate portion for partly embracing said shackle and a straight portion adjoining said arcuate portion and extending below the retaining hook when the latter is in closing position.

BACKGROUND OF THE INVENTION

This invention relates to a self-locking catch for attaching a safety belt in a motor car to a shackle, comprising a bearing plate located between two side plates forming a casing, a spring-loaded retaining hook pivotably mounted on said bearing plate and a locking lever adapted to lock and release said retaining hook and provided with an entraining member projecting from said casing.

For the purpose of attaching a safety belt to a shackle anchored in a motor vehicle it is the practice to use a self-locking catch which can be released by moving its casing in relation to the bearing plate. However, such self-locking catches are not as such suitable for attaching a belt with one hand to a shackle which is anchored to the vehicle floor by a slack anchoring rope or a flexible rod, because a shackle thus anchored tends to yield when the attempt is made to attach or release the catch. On the other hand, the use of a yielding shackle for cooperation with a catch is preferable to a rigidly secured shackle, because the ability of the shackle to yield reduces the injury risk to the passenger using the belt.

For attaching a safety belt to a yieldingly anchored shackle a self-locking catch is desirable which can be attached to and released from the shackle without applying thrust to the shackle as will always be necessary in the case of a self-locking catch of which the casing serves as a grip which is slidably movable in relation to the bearing plate. However, self-locking catches known in the art have the defect that when the belt is under considerable tension they cannot be released otherwise than by the application of considerable force, since the tension of the belt is transmitted to the retaining hooks which must be deflected into releasing position for releasing the belt.

Another drawback of conventional self-locking catches is that whenever the safety belt is under considerable tension, for instance as the result of an accident, a considerable proportion of the tension of the belt must be taken up by the retaining hook and hence by the piovt pin on which the retaining hook pivots. Generally such a pivot pin cannot reliably withstand major loads, at least not to the same extent as the bearing plate, and consequently the pin may fracture or at least the retaining hook may be jammed with very undesirable consequences when an accident has occurred.

SUMMARY OF THE INVENTION

It is therefore the object of the present invention to provide a self-locking catch which with only one hand can be easily attached to a yieldingly anchored shackle, and which can be released with the application of minor force even when the belt itself is under considerable tensile load.

For achieving this object the present invention proposes to provide the bearing plate with an extension which at one end has a bottom edge with a rounded portion for embracing the shackle and adjoining said rounded portion a straight sliding portion which extends below the retaining hook when the latter is in closing position.

This arrangement has the advantage that when the catch is heavily strained by the belt, as may be the case in an accident, nearly the entire tensile load is transmitted by the shackle directly to the bearing plate so that the retaining hook can still be released without the application of major force. This advantage will be particularly pronounced if, according to another feature of the invention, the bottom edge of the extension and the edge on the side of the retaining hook intersect at a point located on the mean line of action of the tensile force applied by the belt to the catch, so that the shackle will bear with one half of its load on the extension and the other half on the hook.

For this purpose a useful arrangement consists in locating the transition between the rounded portion of the bottom edge and the straight portion at the point of intersection between the bottom edge of the extension and the edge on the side of the retaining hook. If this is the case the force needed for releasing the catch will be less than 15 kg. when the load on the loop is 90 kg.

Yet another advantageous feature of the invention consists in providing the retaining hook with a bottom edge which is so designed that it will align with the bottom edge of the extension when the retaining hook is open.

This feature is useful because it creates a relatively long sliding face for the shackle to ride, facilitating the process of release. Moreover, if the straight portion of the bottom edge of the extension points obliquely outwards and contrary to the direction of action of the tensile load applied by the belt to the bearing plate, then the shackle will quite spontaneously slide out of the catch when the releasing slide is operated, without imposing a significant load on the retaining hook and its pivot pin.

BRIEF DESCRIPTION OF THE DRAWINGS

An embodiment of the invention will now be described by way of example and with reference to the accompanying drawings in which.

DESCRIPTION OF THE PREFERRED EMBODIMENT

Figure 1:
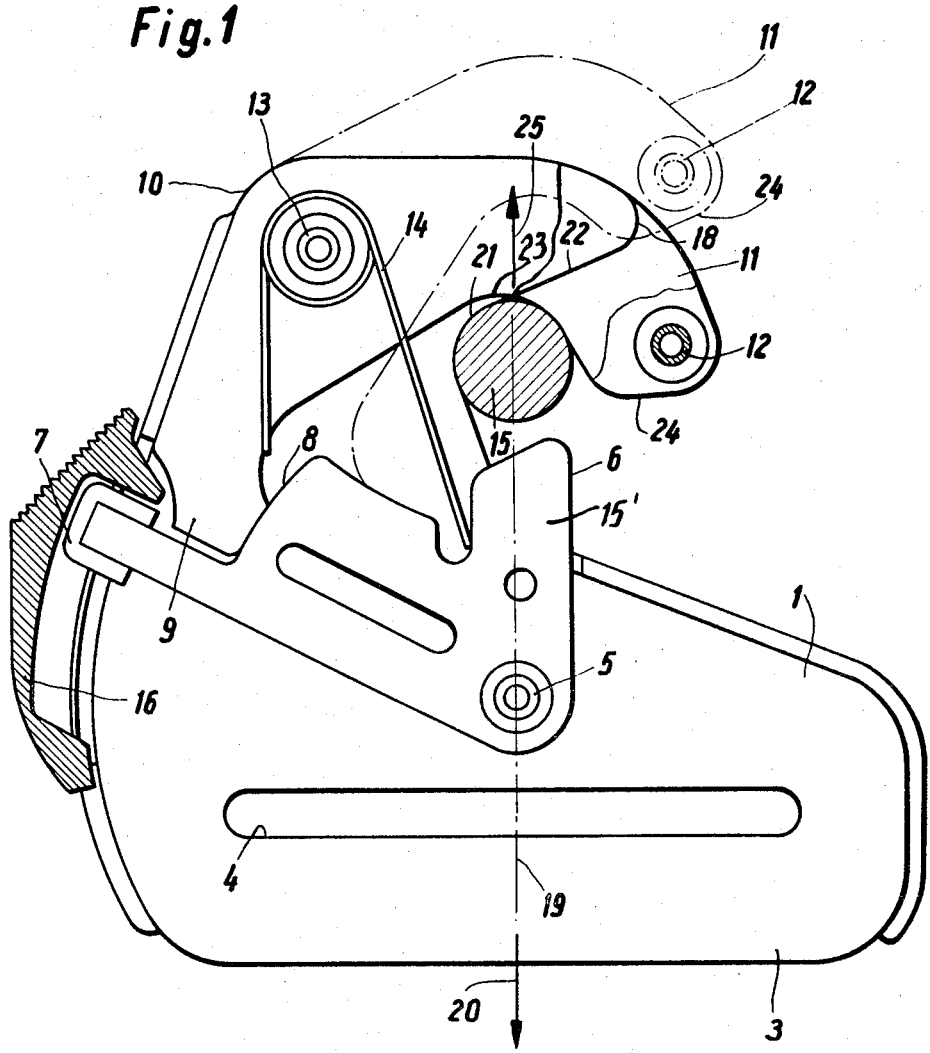
FIG. 1 is a longitudinal section of a self-locking catch according to the invention.
Figure 2:
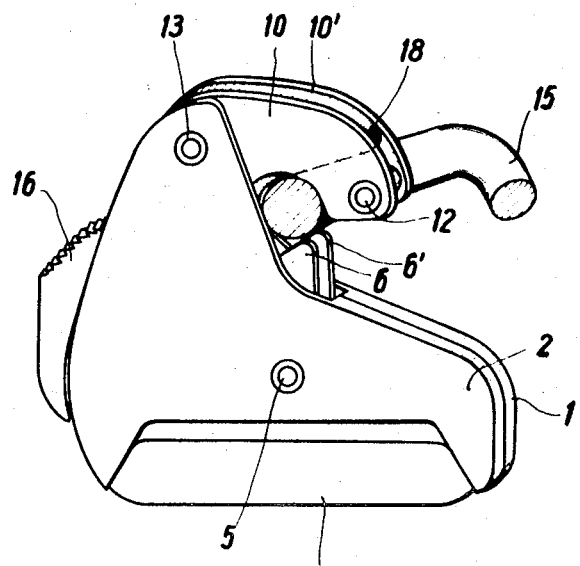
FIG. 2 is a general perspective view of the catch.

Referring to the drawings the illustrated self-locking catch comprises two sideplates 1 and 2 forming a casing and between them enclosing a bearing plate 3 of approximately the same contour. The bottom end of this bearing plate 3 is provided with a slot 4 through which a safety belt, not shown in the drawing, is looped. Above the slot 4 the bearing plate 3 carries a pair of identical locking levers 6 and 6' rockably mounted on a pivot pin 5. The locking lever 6 in FIG. 1 is located on one side and the locking lever 6' on the other side of the bearing plate 3. The ends of the locking levers 6 and 6' which project beyond the edge of the bearing plate 3 are cross connected by an entraining member 7 for deflecting the locking levers about their pivot pin 5.

The locking levers 6 and 6' are formed with an arcuate shoulder 8 facing the entraining member 7. This shoulder 8 forms an edge upon which lever arms 9 of two retaining hooks 10 and 10' can slide. Again, one retaining hook 10 is located on one side and the other retaining hook 10' on the other side of the bearing plate 3. Other arms 11 of the two hooks 10 and 10' are cross connected by a pin 12 and both hooks are fulcrumed on a pivot pin 13 fitted into the bearing plate 3.

The contact pressure of the hook 10 on the locking lever 6 is generated by a spring 14 of which one end engages the inside edge of the lever arm 9 of the retaining hook 10 whereas the other end bears against the back of the locking lever 6. This spring 14 retains the locking lever 6 in the position shown in FIG. 1 in which the retaining hook 10 is locked inasmuch as contact of the retaining hook with the sliding surface 8 prevents it from swinging in the anticlockwise direction. On the other hand, when pushing the locking catch into engagement with the shackle 15 the locking lever 6 and hence the companion locking lever 6' are forced back sufficiently in the anticlockwise direction to permit the shackle 15 to be brought into the position it occupies in FIG. 1. A releasing slide 16 engaging the entraining member 7 need not be touched.

The bearing plate 3 is formed with an extension 18 in the region of the lever arm 11 of the retaining hook 10. This extension projects between the two hooks 10 and 10' beyond the line of action 19 of the pull 20 exerted by the belt. The bottom edge of the extension 18 on the inside of this line of action 19 has a rounded contour 21 which merges tangentially into a straight portion 22 on the other side of the line of action 19, as shown at FIG. 1.

The edge of the retaining hooks 10 and 10' likewise comprise a rounded section 23 which in the locking position shown in FIG. 1 intersects the edge 21, 22 where this crosses the line of action 19 of the pulling force. It will be understood that the line of action 19 of this force is normal to the slot 4 and crosses it in the middle, as may be assumed to be the case when the catch is normally loaded. The bottom edges 24 of the two retaining hooks 10 and 10' are so designed that when the releasing slide 16 is pushed downwards and these hooks are raised these edges 24 will align with the straight edge 22, as indicated in FIG. 1, by dot-dash lines.

As shown at FIG. 1, locking levers 6 each include a nose portion 15' which extends across the opening through which shackle 15 is inserted to secure the shackle to the catch.

From the description of the arrangement in FIG. 1 the illustrated self-locking catch will be understood to function as follows:

If it is desired to clip the catch to a shackle 15 the releasing slide 16 need not be operated because the pressure of the shackle 15 against the nose 15' of the locking levers 6 and 6' and the retaining hooks 10 and 10' will cause the locking levers 6 and 6' to yield against the resistance of the springs 14 until the shackle 15 is located in the position shown in FIG. 1, in which position the locking levers are restored to their former positions by the thrust of the spring. If now in this position of use of the locking catch a considerable load acts on the shackle 15 in the direction of the arrow 20, say because of an accident, then the reactive load 25 will act on the extension 18 of the bearing plate 3. In other words, substantially the entire load will be transmitted directly to the bearing plate 3.

Consequently even when the belt is under considerable tension the lock can be easily opened without major effort by operating the releasing slide 16, since the load on the retaining hooks 10 and 10' is only slight and only the very slight friction between the lever arms 9 and the sliding surfaces 8 need be overcome for opening the catch.

The opening action, i.e. the release of the shackle 15, is incidentally facilitated by the fact that when the levers 6 and 6' swing back and the hooks assume the position shown in dot-dash lines a sliding face inclined away from the pulling force 20 will be created along which the locking catch will tend spontaneously to slip off the shackle 15.

The invention may be embodied in other specific forms without departing from the spirit or essential characteristics thereof. The present embodiment is therefore to be considered in all respects as illustrative and not restrictive.

What is claimed is:

1. A self-locking and readily releasable catch assembly for securing a safety belt in a motor vehicle to a shackle, comprising a bearing plate and having a shackle retaining edge, and a locking lever adapted to lock and release said retaining hook, an extension of said bearing plate having an edge comprising an arcuate edge portion and a slanting edge portion joining said arcuate portion tangentially and slanting obliquely outwardly in a direction opposite to the direction of the pull of the belt on the bearing plate, said slanting edge portion co-operating with said retaining edge, with the retaining hook in its shackle retaining position, to provide a pocket for said shackle in which the shackle engages both said slanting edge and said retaining edge and the pull of the belt is resisted by both said edges; whereby, only a portion of the pull of the belt is resisted by the retaining hook and the hook can readily be released, and upon release of the hook, the shackle is free to slide along said slanted edge regardless of the magnitude of the pull exerted on the shackle by the belt.

2. A self-locking catch assembly according to claim 1, wherein said slanting edge on said extension and the retaining edge on the hook intersect at a point located on the mean line of action of the tensile forces applied by the belt to the catch, said edges co-operating in such a manner that approximately one half of the force is resisted by said slanting edge of said plate and the remainder of the force is resisted by the retaining edge of said hook.

3. A self-locking catch assembly according to claim 1, wherein said retaining hook, in said closed position, and said bearing plate co-operate to define a transverse opening of a size larger than the diameter of the shackle, said locking lever includes a nose and is mounted on said bearing plate, for movement to a shackle retaining position in which said nose obstructs said opening, and for movement to a shackle receiving position in which said nose is to one side of said opening and the opening is unobstructed for insertion of the shackle through the opening, and spring means normally urging said lever to the shackle retaining position.

4. A one hand operable self-locking and readily releasable catch assembly for securing a safety belt in a motor vehicle to a shackle comprising a bearing plate having an enlarged body and an extension integral with and projecting from one end of said body; a retaining hook adjacent said extension and pivotally mounted on said bearing plate, said retaining hook having a shackle retaining edge facing toward the other end of said body; said extension having an edge facing toward said other end of said body and comprising an arcuate edge portion partly embracing said shackle and edge, another portion extending obliquely outwardly and inclined in a direction opposite to the direction of pull of the belt on the bearing plate, said another portion merging smoothly with said arcuate portion; said shackle retaining edge extending across said edge of said extension and toward said other end of said body; said edges of said extension and hook cooperating to define a shackle retaining pocket having a transverse opening to receive the shackle; a locking lever pivotally mounted on said body and between said extension and said other end of said body, said lever including a stop shoulder to lock said retaining hook in its closed position and a nose extending at least partially across said transverse opening to retain a shackle against displacement from said pocket; manually manipulable means to move said locking lever to a position in which said nose is to one side of said transverse opening to permit inserting a shackle through the opening; and spring means normally urging said locking lever to the first mentioned position and normally urging the retaining hook toward its closed position; whereby, the force resulting from a pull on the belt is resisted by both said extension edge of said plate and said retaining edge of said hook, and said manually manipulable means provides for one hand connecting of said catch assembly to a flexibly mounted shackle.

References Cited

UNITED STATES PATENTS

| | | | |
|---|---|---|---|
| 2,847,748 | 8/1958 | Robinton | 24—75 X |
| 3,405,966 | 10/1968 | Harley | 24—241 PSP X |
| 3,457,603 | 7/1969 | Romanzi, et al. | 24—241 |

FOREIGN PATENTS

| | | | |
|---|---|---|---|
| 701,214 | 12/1953 | Great Britain | 24—241 SP |

PAUL R. GILLIAM, Primary Examiner

U.S. Cl. X.R.

24—241 SP; 297—385